United States Patent
Bitton

(10) Patent No.: US 11,761,056 B2
(45) Date of Patent: Sep. 19, 2023

(54) SYSTEMS AND METHODS FOR RECYCLING WASTE METAL PIECES USING SHOT BLASTING AND SHOT REMOVAL

(71) Applicant: House of Metals Company Limited, Toronto (CA)

(72) Inventor: Daniel Bitton, Toronto (CA)

(73) Assignee: HOUSE OF METALS COMPANY LIMITED, Toronto (CA)

( * ) Notice: Subject to any disclaimer, the term of this patent is extended or adjusted under 35 U.S.C. 154(b) by 146 days.

(21) Appl. No.: 17/331,919

(22) Filed: May 27, 2021

(65) Prior Publication Data

US 2021/0394194 A1 Dec. 23, 2021

Related U.S. Application Data

(60) Provisional application No. 63/040,243, filed on Jun. 17, 2020.

(51) Int. Cl.
*C22B 21/00* (2006.01)
*B02C 25/00* (2006.01)
*B02C 21/00* (2006.01)

(52) U.S. Cl.
CPC ........ *C22B 21/0007* (2013.01); *B02C 21/007* (2013.01); *B02C 25/00* (2013.01)

(58) Field of Classification Search
CPC . C22B 21/0069; C22B 21/0007; C22B 7/005; B02C 21/007

See application file for complete search history.

(56) References Cited

U.S. PATENT DOCUMENTS

| | | |
|---|---|---|
| 3,905,556 A | 9/1975 | Drage |
| 4,069,145 A | 1/1978 | Sommer, Jr. et al. |
| 4,337,900 A | 7/1982 | Williams et al. |
| 4,476,655 A | 10/1984 | Ansbaugh |
| 4,609,155 A | 9/1986 | Garnier |
| 4,965,968 A | 10/1990 | Kelsall |
| 5,060,871 A | 10/1991 | Brassinga et al. |

(Continued)

FOREIGN PATENT DOCUMENTS

| | | | |
|---|---|---|---|
| GB | 1596515 A | * 8/1981 | ............. B01D 33/11 |
| WO | 9519454 A1 | 7/1995 | |

OTHER PUBLICATIONS

International Search Report and Written Opinion dated Aug. 13, 2021 in respect of PCT/CA2021/050770.

*Primary Examiner* — Katrina M Stransky
*Assistant Examiner* — P Derek Pressley
(74) *Attorney, Agent, or Firm* — Bereskin & Parr LLP/S.E.N.C.R.L., s.r.l.

(57) ABSTRACT

A method and system of recycling aluminum alloy wheels, the method and system comprising (a) providing a feed of aluminum alloy wheels of a particular alloy; (b) fragmenting the aluminum alloy wheels into a plurality of fragments (c) shot blasting the plurality of fragments to clean non-aluminum contaminants off the plurality of fragments; (d) separating the plurality of fragments from the plurality of shot by moving a mixture of the plurality of fragments and the plurality of shot adjacent a dividing surface; and (e) providing the remaining plurality of fragments for use in manufacturing at least one component made from aluminum alloy.

19 Claims, 5 Drawing Sheets

(56) References Cited

U.S. PATENT DOCUMENTS

| | | |
|---|---|---|
| 5,133,505 A | 7/1992 | Bourcier et al. |
| 5,333,797 A | 8/1994 | Becker et al. |
| 5,443,157 A | 8/1995 | Baker et al. |
| 5,769,331 A | 6/1998 | Yamagishi et al. |
| 5,885,141 A | 3/1999 | Watkin |
| 6,375,106 B1 | 4/2002 | Sears |
| 6,442,493 B1 | 7/2002 | Simon et al. |
| 6,983,901 B2 | 1/2006 | Bitton et al. |
| 2005/0051647 A1* | 3/2005 | Bitton .................. C22B 7/005 241/25 |
| 2013/0017767 A1* | 1/2013 | Suzuki .................. B24C 9/00 451/86 |
| 2017/0173636 A1 | 6/2017 | Bitton |

\* cited by examiner

SYSTEMS AND METHODS FOR RECYCLING WASTE METAL PIECES USING SHOT BLASTING AND SHOT REMOVAL

CROSS REFERENCE TO RELATED APPLICATION

This application claims priority to U.S. Provisional Application No. 63/040,243, filed Jun. 17, 2020, the entire contents of which are hereby incorporated by reference.

FIELD

The described embodiments relate to the field of recycling, in particular, the field of shot blasting and shot removal during the recycling process.

BACKGROUND

Recycling what would otherwise be waste materials to form new materials or objects is important in modern waste management. Many different materials can be recycled, for example, glass, paper, cardboard, metal, plastic, tires, textiles, batteries, and electronics. The typical method for recycling waste material includes pickup, sorting, cleaning, and processing.

Metals are of particular value for recycling. Unlike other materials, metals may be recycled into products of substantially similar quality to their feed material.

Slight differences in elemental composition can result in vastly different material properties. Certain high value alloys have very specific elemental compositions. Metals provided for recycling may have discrepancies in elemental composition from desired high value alloys. These discrepancies may be due to debris deposited on the metals provided for recycling.

SUMMARY

This summary is intended to introduce the reader to various aspects of the applicant's teaching, but not to define any specific embodiments. In general, disclosed herein are one or more methods of recycling waste metal.

In a first aspect, some embodiments of the invention provide a method of recycling aluminum alloy wheels. The method comprises: providing a feed of aluminum alloy wheels of a particular alloy; fragmenting the aluminum alloy wheels into a plurality of fragments such that more than 95% of a mass of the quantity of the aluminum alloy wheels is fragmented such that each fragment in the 95% of the mass of the quantity of the aluminum alloy wheels has a maximum length of more than $\frac{1}{2}$ L; providing a plurality of shot wherein each shot in the plurality of shot has a maximum length of $\frac{1}{8}$ L or less; shot blasting the plurality of fragments with the plurality of shot to clean non-aluminum contaminants off the plurality of fragments; providing a dividing surface for separating the plurality of fragments from the plurality of shot, the dividing surface having a plurality of holes wherein each hole in the plurality of holes is large enough for objects having a maximum length of $\frac{3}{8}$ L or less to pass through and small enough to block objects having a maximum length of $\frac{5}{8}$ L or more from passing through; after shot blasting the plurality of fragments with the plurality of shot, separating the plurality of fragments from the plurality of shot by moving a mixture of the plurality of fragments and the plurality of shot adjacent the dividing surface such that at least a portion of the plurality of shot passes through the dividing surface via the plurality of holes, separating at least the portion of the plurality of shot from a remaining plurality of fragments not passing through the dividing surface via the plurality of holes; and providing the remaining plurality of fragments for use in manufacturing at least one component made from aluminum alloy.

According to some aspects of some embodiments of the present invention, the maximum length of each shot in the plurality of shot is $\frac{1}{16}$ L or less; and the maximum length of each fragment in the plurality of fragments is at least L.

According to some aspects of some embodiments of the present invention, providing the dividing surface for separating the plurality of fragments from at least the portion of the plurality of shot comprises providing a container having an interior defined by an exterior wall, the dividing surface being provided within the interior of the container.

According to some aspects of some embodiments of the present invention, moving the mixture of the plurality of fragments and the plurality of shot adjacent the dividing surface comprises moving the container and the dividing surface.

According to some aspects of some embodiments of the present invention, moving the container and the dividing surface comprises operating a drive mechanism to rotate the container; and, the drive mechanism is separated from the plurality of fragments and the plurality of shot by the exterior wall of the container to isolate the drive mechanism from the plurality of fragments and the plurality of shot within the interior of the container.

According to some aspects of some embodiments of the present invention, the method further comprises: defining a flow-through rate of the mixture of the plurality of fragments and the plurality of shot within the interior of the container; after separating the remaining plurality of fragments from at least the portion of the plurality of shot, checking the remaining plurality of fragments for residual shot; determining a mass proportion of the residual shot relative to the remaining plurality of fragments containing the residual shot; and when the proportion of the residual shot exceeds a first threshold proportion, reducing the flow-through rate of the mixture of the plurality of fragments and the plurality of shot within the interior of the container; otherwise not reducing the flow-through rate.

According to some aspects of some embodiments of the present invention, the method further comprises: determining an aggregate composition estimate for the remaining plurality of fragments by determining a plurality of composition measurements of the material of the remaining plurality of fragments, the aggregate composition estimate comprising a plurality of element concentration estimates comprising an element concentration estimate for each element in a plurality of elements; selecting a selected target alloy, the selected target alloy having a plurality of element ranges comprising an element range for each element in the plurality of elements; and determining the first threshold proportion based on the aggregate composition estimate and the selected target alloy.

According to some aspects of some embodiments of the present invention, more than 99% of the mass of the quantity of the aluminum alloy wheels is fragmented into fragments having the maximum length of L or more.

According to some aspects of some embodiments of the present invention, checking the remaining plurality of fragments for residual shot comprises operating at least one magnet to magnetically attract the residual shot within the remaining plurality of fragments, each shot of the residual shot being attractable by the at least one magnet, and the at least one magnet is of sufficient strength and proximity to that shot to exert a magnetic force on that shot sufficient to draw that shot into contact with the at least one magnet.

According to some aspects of some embodiments of the present invention, the method further comprises after moving the mixture of the plurality of fragments and the plurality of shot adjacent the dividing surface such that at least a portion of the plurality of shot passes through the dividing surface via the plurality of holes, moving the remaining plurality of fragments and any residual shot within a trapping distance of at least one magnet such that the at least one magnet exerts a magnetic force on the residual shot sufficient to draw that residual shot into contact with the at least one magnet.

According to some aspects of some embodiments of the present invention, moving the mixture of the plurality of fragments and the plurality of shot adjacent the dividing surface comprises moving the mixture of the plurality of fragments and the plurality of shot along an inclined path adjustable to have a downward inclination within an inclination range between a maximum downward inclination and one of a minimum downward inclination and a horizontal inclination.

According to some aspects of some embodiments of the present invention, reducing the flow-through rate comprises reducing the downward inclination within the inclination range.

According to some aspects of some embodiments of the present invention, when a second threshold proportion exceeds a mass proportion of the residual shot relative to the remaining plurality of fragments containing the residual shot, the method further comprises increasing the flow-through rate of the mixture of the plurality of fragments and the plurality of shot within the interior of the container; otherwise not increasing the flow-through rate.

According to some embodiments of the present invention, there is provided a system for recycling aluminum alloy wheels. The system comprises: a conveyor for providing a feed of aluminum alloy wheels of a particular alloy; a fragmenting unit for receiving the feed of aluminum alloy wheels from the conveyor and for fragmenting the aluminum alloy wheels into a plurality of fragments such that more than 95% of a mass of the quantity of the aluminum alloy wheels is fragmented into fragments having a maximum length of more than ½ L; a blast chamber for receiving the plurality of fragments from the fragmenting apparatus and for subjecting the plurality of fragments to shot blasting to provide a plurality of shot blasted pieces, wherein the blast chamber comprises a plurality of shot to provide the shot blasting, and each shot in the plurality of shot has a maximum length of ⅛ L or less; and, a separator for receiving the plurality of fragments and the plurality of shot blasted pieces, the separator comprising a dividing surface for separating the plurality of fragments from the plurality of shot, the dividing surface having a plurality of holes wherein each hole in the plurality of holes is large enough for objects having a maximum length of ⅜ L or less to pass through and small enough to block objects having a maximum length of ⅝ L or more from passing through; wherein, in operation, a mixture of the plurality of fragments and the plurality of shot is moved adjacent the dividing surface such that at least a portion of the plurality of shot passes through the dividing surface via the plurality of holes, separating at least the portion of the plurality of shot from a remaining plurality of fragments not passing through the dividing surface via the plurality of holes; the remaining plurality of fragments being usable to manufacture at least one component made from aluminum alloy.

In some variants of the system for recycling aluminum alloy wheels, the maximum length of each shot in the plurality of shot is ¹⁄₁₆ L or less; and, the maximum length of each fragment in the plurality of fragments is at least L.

In some variants of the system for recycling aluminum alloy wheels, the separator further comprises a container having an interior defined by an exterior wall, the dividing surface being provided within the interior of the container.

In some variants of the system for recycling aluminum alloy wheels, the container and the dividing surface are moveable to move the mixture of the plurality of fragments and the plurality of shot adjacent the dividing surface.

In some variants of the system for recycling aluminum alloy wheels, the separator further comprises a drive mechanism for rotating the container to move the container and the dividing surface, and to move the mixture of the plurality of fragments and the plurality of shot adjacent the dividing surface; and, the drive mechanism is separated from the plurality of fragments and the plurality of shot by the exterior wall of the container to isolate the drive mechanism from the plurality of fragments and the plurality of shot within the interior of the container.

In some variants of the system for recycling aluminum alloy wheels, L is at least 1 inch.

In some variants of the system for recycling aluminum alloy wheels, the system further comprises: a passageway for the remaining plurality of fragments; and at least one magnet positioned within the passageway to magnetically attract residual shot within the remaining plurality of fragments within the passageway, each shot of the residual shot being attractable by the at least one magnet; wherein the at least one magnet is of sufficient strength, and a cross-sectional area of the passageway intersecting with the at least one magnet is small enough, such that, in operation, any shot in the residual shot passing through the cross-sectional area is close enough to the at least one magnet for the at least one magnet to exert a magnetic force on that shot sufficient to draw that shot into contact with the at least one magnet.

BRIEF DESCRIPTION OF THE DRAWINGS

These and other advantages of the instant invention will be more fully and completely understood in conjunction with the following detailed description of embodiments and aspects of the present invention with reference to the following drawings, in which.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

Figure 1:
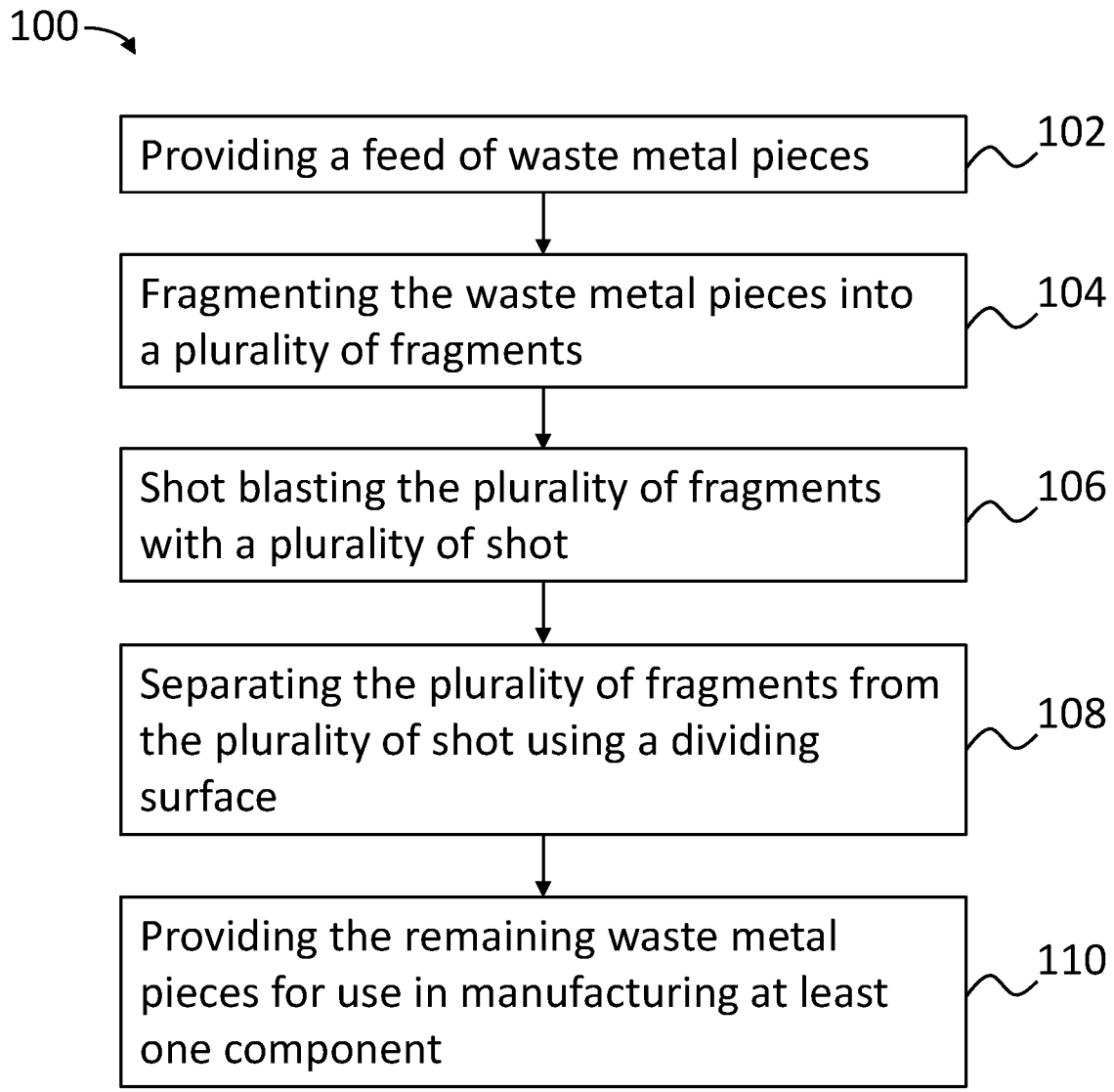
FIG. 1, in a flow chart, illustrates a method of recycling waste metal pieces.

Reference is first made to FIG. 1, in which a method 100 for recycling waste metal pieces is shown. Method 100 begins with providing a feed of waste metal pieces at step 102. The waste metal pieces provided at step 102 are of a particular alloy type. For example, the feed of waste metal pieces may be a feed of waste metal pieces composed of aluminum alloys. In other examples, the feed of waste metal pieces may be a feed of waste metal pieces composed of any one of bismuth alloys, brass alloys, cobalt alloys, copper alloys, gallium alloys, gold alloys, indium alloys, iron alloys, lead alloys, magnesium alloys, mercury alloys, nickel alloys, potassium alloys, silver alloys, steel alloys, tin alloys, titanium alloys, zinc alloys, zirconium alloys, etc.

In some examples of method 100, although each piece of waste metal in the feed may be made of the same alloy type, its composition may differ from the composition of at least one of the other pieces in the feed. In some examples, each piece may be one composition of two different compositions present in the feed. In other examples, each piece of waste metal may be one composition of any number of different compositions present in the feed of waste metal. The batch of waste metal pieces will have an aggregate or batch composition based on the different compositions of the different pieces of waste metal, as well as the relative masses of those pieces of waste metal. That is, if all of the pieces of waste metal were to be melted down and mixed to provide a homogeneous aggregate or mixture, then the composition of that homogeneous mixture would be this aggregate or batch composition. This batch composition of the feed of waste metal pieces may be unknown when the pieces of waste metal are initially provided.

The pieces of waste metal in this feed of waste metal may all originate from the same kind of components being recycled. For example, a feed of aluminum alloy wheels of a particular alloy, such as aluminum alloy A356.2. Despite all the waste metal pieces being of a particular alloy type, they may nonetheless differ slightly in composition. Material properties may vary significantly with slight variations in composition. Alloys with certain specific elemental compositions may exhibit material properties that are much more desirable than alloys with slightly varying elemental compositions. These material properties may include mechanical strength properties, chemical resistance properties, corrosion resistance and other properties. For example, certain specific elemental compositions may result in a measurably greater mechanical yield strength in tension.

At step 104, the waste metal pieces are fragmented into a plurality of fragments. In some examples, fragments may be produced by passing waste metal pieces through a fragmenting unit. A fragmenting unit may be a shredding apparatus. Any suitable shredder known in the art may be used. For example, waste metal pieces may be supplied to a hopper of a conventional shredding apparatus, such as the SSI Series 45H shredder available from SSI Shredding Systems Inc. at 9760 SW Freeman Drive, Wilsonville, Oreg., 97070-9286, USA. This shredding apparatus may include a cutter box housing cutters, which can be mounted on parallel shafts that rotate horizontally in opposite directions. The feed hopper can be located above the cutter box. Due to the force of gravity, the waste metal pieces placed in the feed hopper can then be fed downwardly into the proper location where they can be engaged by the cutters and torn or cut into shreds.

In some examples of the method 100, at step 104, the waste metal pieces may be fragmented into a plurality of fragments such that more than 95% of a mass of the quantity of the feed of waste metal pieces is fragmented into relatively large fragments. This can, for example without limitation, be accomplished by adjusting the spacing separating the cutters within the cutter box, and the alignment of the waste metal pieces as they encounter the cutters. Further, in some examples, the waste metal pieces may be fragmented such that each fragment in the 95% of the mass of the quantity of waste metal pieces has a maximum length of more than ½ L. In other examples, the maximum length of each fragment in the plurality of fragments may be at least L. The maximum length of a fragment is the greatest distance between any two points on that fragment. For example, if a fragment were spherical, the maximum length would be the diameter of the sphere. If a fragment were a cube, the maximum length would be from a first corner to its opposite corner (the opposite corner would be separated from the first corner by each of the three orthogonal dimensions of the cube). As described in detail below, the numeric value for L may depend on the characteristics of the separator that may be used to separate the plurality of fragments from the plurality of shot after the shot blasting step. In some examples, L may be 1 inch.

At step 106, each fragment of the plurality of fragments is subjected to shot blasting. Waste metal pieces provided at step 102 may be coated in a number of coatings, such as paints, metal electroplating, ceramic coatings or plastic coatings. Similarly, external surfaces of waste metal pieces may be characterized by corrosion or environmental contamination. After the fragmenting process 104, surfaces of fragments that were previously external surfaces of waste metal pieces may still be coated with a coating, corroded or otherwise contaminated. Newly exposed surfaces created by the fragmenting process 104 may be devoid of coatings.

When waste metal pieces or fragments are created from the waste metal pieces provided for recycling, the recycling process may include melting the pieces into a bulk or aggregate batch. The composition of the aggregate batch would include elements present in any coatings or surface contamination present on the external surfaces of the waste metal pieces provided, skewing the aggregate batch composition away from the composition of base alloys provided. This is undesirable, as material properties are sensitive to elemental composition. Accordingly, it may be desirable to remove external surface coatings, corrosion and surface contamination, leaving behind a bare metal surface, free of contamination, coatings or corrosion.

During the shot blasting process 106, abrasive particles, i.e. a plurality of shot, can be projected at the fragments at high speed. The shot impacts the surfaces of the fragments. These impacts can dislodge coatings, corrosion, contamination and debris deposited on the surface of the fragments, resulting in fragments with bare metal surfaces largely free from coatings, corrosion, environmental contamination and debris.

Shot blasting may be conducted in any suitable shot blasting apparatus. For example, the apparatus may be a centrifugal blasting apparatus, such as the model (FB-4/28/E/MR) Flexbel system available from BCP Wheelabrator of 1219 Corporate Drive, Burlington, Ontario, L7L 5V5, Canada, which is suitable for blast cleaning small parts. Abrasives may include steel shot, alumina, silica and other abrasive materials. In some examples, each shot in the plurality of shot may have a maximum length of ⅛ L or less. In other examples, each shot in the plurality of shot may have a maximum length of ⅟₁₆ L or less.

At step 106, the shot may impact the fragments with sufficiently high energy such that singular fragments are separated into multiple shot blasted pieces. In some examples, fragments may be separated into shot blasted pieces that are of substantially the same mass. For example, a single fragment may be separated into two shot blasted pieces during the shot blasting process. These two pieces may each be approximately half the mass of the fragment that the shot blasted pieces were formed from. In other examples, a single fragment may be separated into two pieces, wherein one piece is substantially the same mass as the fragment that the shot blasted pieces were formed from, and the other piece is of a significantly smaller mass. In other examples, a single fragment may be separated into a plurality of pieces, of varying masses. In some embodiments, step 106 can produce shot blasted pieces much smaller than any fragment in the plurality of fragments produced in step 104.

At step 106, some fragments may be impacted with shot, yet remain intact. For example, a single fragment may be impacted with shot during the shot blasting process to produce only a single shot blasted piece. The shot blasted piece produced may be substantially the same mass as the fragment that was shot blasted to produce the shot blasted piece. Any discrepancy in mass may be attributed to the removal of any surface coatings, corrosion, contamination and debris, present on the surface of the fragment before shot blasting, in addition to the absence of a relatively thin layer of base metal material that may have been removed during shot blasting.

At step 108, the plurality of shot blasted fragments may be separated from the plurality of shot. The plurality of shot blasted fragments separated from the plurality of shot during the separating step 108 is herein called the remaining plurality of fragments. As described above, it may be desirable to separate the plurality of fragments from the plurality of shot because including the shot in the aggregate batch might skew the aggregate batch composition away from the composition of base alloys provided. This can be undesirable, as material properties are sensitive to elemental composition. Although desirable, in some examples, it may be impractical to completely separate the plurality of fragments from the plurality of shot. That is, in some examples, a portion of the plurality of fragments and the plurality of shot might be separated from the remaining plurality of fragments. Further, in some examples, a portion of the plurality of shot may not be separated from the remaining plurality of fragments.

At step 108, to separate the plurality of fragments from the plurality of shot, the plurality of fragments and the plurality of shot may be moved adjacent to a dividing surface such that at least a portion of the plurality of shot passes through the dividing surface. In some examples, the dividing surface may be a sheet having a plurality of holes therein. In some examples, the dividing surface may be a container having an interior defined by an exterior wall. In this example, the dividing surface may be provided within the interior of the container, described in more detail below.

In some examples of the dividing surface, each hole of the plurality of holes may be large enough for objects having a maximum length of ⅜ L or less to pass through and small enough to block objects having a maximum length of ⅝ L or more from passing through. The holes in the dividing surface may be any shape, including but not limited to, circular, oval, square, or any other polygon, provided that this shape allows the shot to readily pass through.

As described above, in some examples, the waste metal pieces may be fragmented into fragments having a maximum length of ½ L or more at step 104 and the shot used during the shot blasting step 106 may have a maximum length of ⅛ L or less. Further, in some examples, some fragments of the plurality of fragments may have been separated into multiple shot blasted fragments during step 106 which may have reduced the maximum length of that fragment. Accordingly, a dividing surface as described above may, in addition to allowing the shot to pass through the plurality of holes, allow a portion of the plurality of fragments to also pass through the plurality of holes. Further, due to the irregular shape of the fragments, in some examples, at certain orientations, a fragment having a maximum length of more than ⅝ L may pass through the dividing surface. For example, a fragment may have a tall and narrow cylindrical shape with a height of L and a diameter of ⅛ L. By chance, this fragment could pass through a hole in the dividing surface if oriented with its height orthogonal to the dividing surface.

The dividing surface may have holes large enough to allow for a portion of the plurality of fragments to pass through because, as the size of the holes in the dividing surface increases, the percentage of shot that passes through the dividing surface may also increase. The applicant has found that it may be preferable to lose a portion of the plurality fragments, i.e. reduce the total mass of the remaining portion of fragments, during the separating stage as opposed to retaining shot in the remaining portion of fragments. This is because it may be preferable to provide a remaining plurality of fragments for use in manufacturing having a composition close to the alloy composition as opposed to providing a greater mass of the remaining plurality of fragments.

At step 110, the remaining plurality of fragments can be provided to a recycling facility, such as a foundry, for incorporation into a recycling process in order to recycle the fragments into new metal products.

Figure 2:
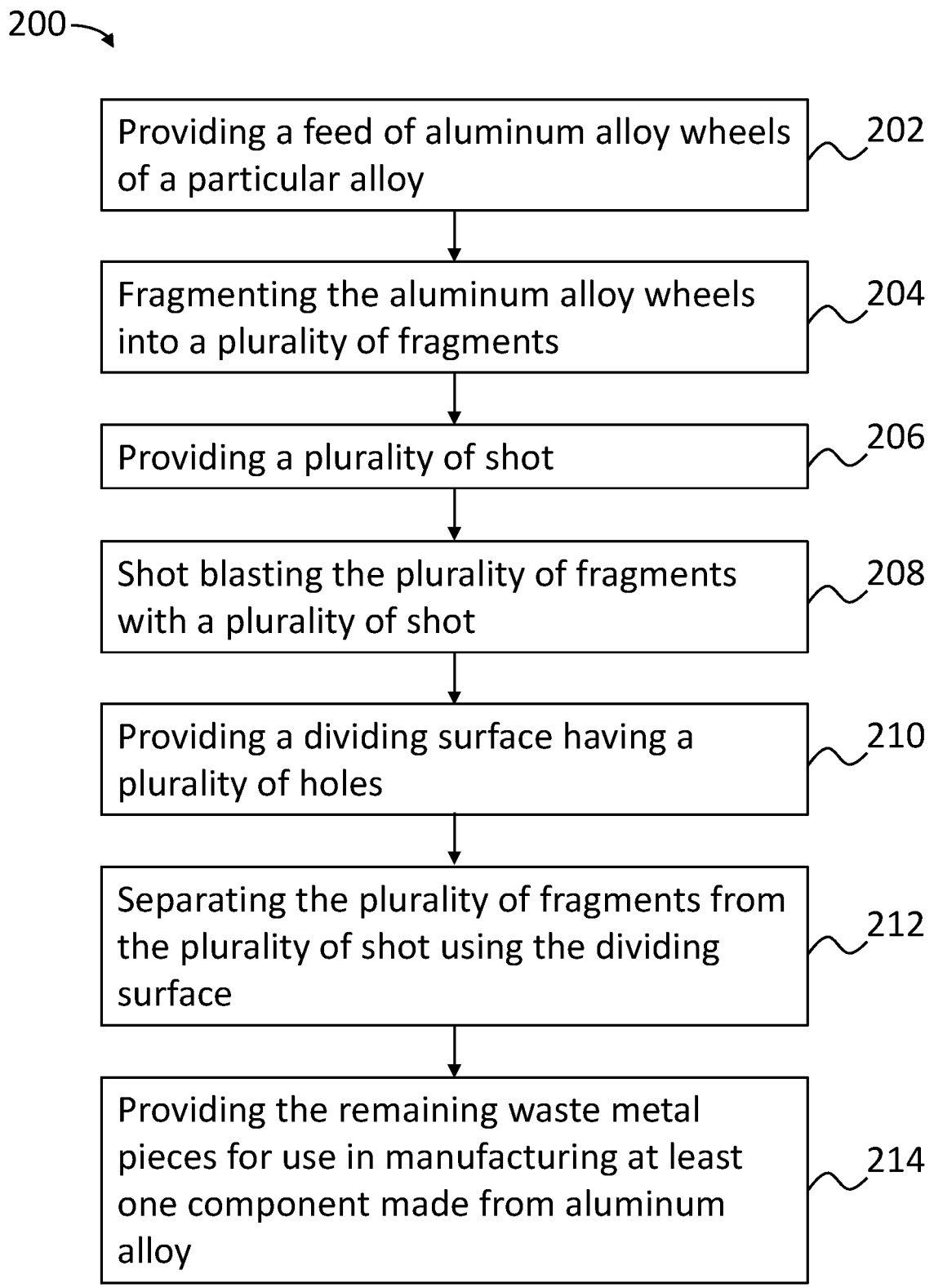
FIG. 2, in a flow chart, illustrates a method of recycling aluminum alloy rims.

Referring now to FIG. 2, shown therein is method 200 of recycling aluminum alloy wheels. Method 200 of recycling aluminum alloy wheels is an example of an application of method 100 of recycling waste metal pieces. Accordingly, the examples discussed below may be applied to method 100 and the examples discussed above in reference to method 100 can be applied to method 200. Moreover, the discussion below is not meant to limit the methods described herein to that of recycling aluminum alloy wheels. For example, the methods described herein may be applied to a method for recycling objects made of steel alloys, copper alloys, or any other suitable metal.

In step 202 of method 200, a feed of aluminum alloy wheels of a particular alloy is provided. In some examples, this alloy may be A356.2 aluminum alloy. Similar to the waste metal pieces described above, although the aluminum alloy wheels are of a particular alloy, the composition of the wheels may vary. Accordingly, the aggregate composition of a batch of aluminum alloy wheels may be unknown when the batch is initially provided. In some examples, the average diameter of an aluminum alloy wheel in the feed of aluminum alloy wheels may be between 14 L and 28 L. In some examples, L may be 1 inch.

In step 204 of method 200, the aluminum alloy wheels may be fragmented into a plurality of fragments. The wheels may be fragmented by running the wheels through a fragmenting unit, such as an industrial shredder. Fragments produced by the fragmenting process may be of substantially uniform size.

The size of fragments produced during the fragmenting process 204 may vary depending on the design and configuration of the fragmenting unit, for example, the size, spacing and orientation of shredders or cutters. The fragments may be just small enough to facilitate removal of contaminants. Put another way, the fragments may be as large as possible given the need to remove the contaminants.

In some examples, more than 95% of the mass of fragments produced in step 204 may be fragmented such that each fragment has a maximum length of more than ½ L.

In some examples, more than 99% of the mass of fragments produced in step 204 may be fragmented such that each fragment has a maximum length of more than ½ L.

In some examples, more than 99% of the mass of fragments produced in step 204 may be fragmented such that each fragment has a maximum length of more than L.

In some examples, L may be at least 1 inch.

In step 206 of method 200, a plurality of shot may be provided. In some examples, each shot in the plurality of shot provided may have a maximum length of ⅛ L or less. In step 208, using the plurality of shot, the fragments are subjected to shot blasting. During step 208, the plurality of shot may be directed at the fragments at high speed. This shot may impact the surface of the fragments, dislodging coatings, corrosion, and environmental contamination. The resulting shot blasted pieces can be bare, aluminum alloy shot blasted pieces.

In step 208 of method 200, the shot may impact fragments with sufficiently high energy to separate singular fragments into a plurality of shot blasted pieces, which are smaller than the fragments before shot blasting.

In step 210 of method 200, a dividing surface for separating the plurality of fragments from the plurality of shot may be provided. In some examples, as described above, the dividing surface may have a plurality of holes therein that are large enough for objects having a maximum length of ⅜ L or less to pass through and small enough to block objects having a maximum length of ⅝ L or more from passing through.

In step 212 of method 200, the plurality of fragments may be separated from the plurality of shot by moving a mixture of the plurality of fragments and the plurality of shot adjacent the dividing surface provided in step 210. Moving the mixture may allow for at least a portion of the plurality of shot to pass through the dividing surface via the plurality of holes, separating at least the portion of the plurality of shot from a remaining plurality of fragments not passing through the dividing surface via the plurality of holes.

In some examples, the dividing surface may include a container having an interior defined by an exterior wall and the dividing surface may be provided within the interior. In this example, moving the mixture of the plurality of fragments and the plurality of shot adjacent the dividing surface may include moving the container and the dividing surface. Specifically, in some examples, moving the container and the dividing surface may include operating a drive mechanism to rotate the container. By rotating the container, the mixture of fragments and shot may be moved adjacent the dividing surface and at least a portion of the plurality of shot may be separated from the remaining portion of fragments not passing through the dividing surface.

An empirical study of the size distribution of the remaining plurality of aluminum alloy fragments (the aluminum alloy fragments left after removal of the shot and some of the smaller aluminum alloy fragments) provided by an example method in accordance with an aspect of an embodiment of the invention was conducted. This empirical study yielded the following results:

Fragments or shot <0.25"—less than 0.0%
Fragments or shot 0.25"<x<0.5"-6.7%
Fragments or shot 0.5"<x<2"-12.4%
Fragments or shot 2"<x<6"-66.6%
Fragments or shot >6"-14.3%

In the example method of this empirical study, the dividing surface comprised holes approximately ½ inch in diameter, while the, diameter of the shot was less than ⅛ inch.

Figure 3:
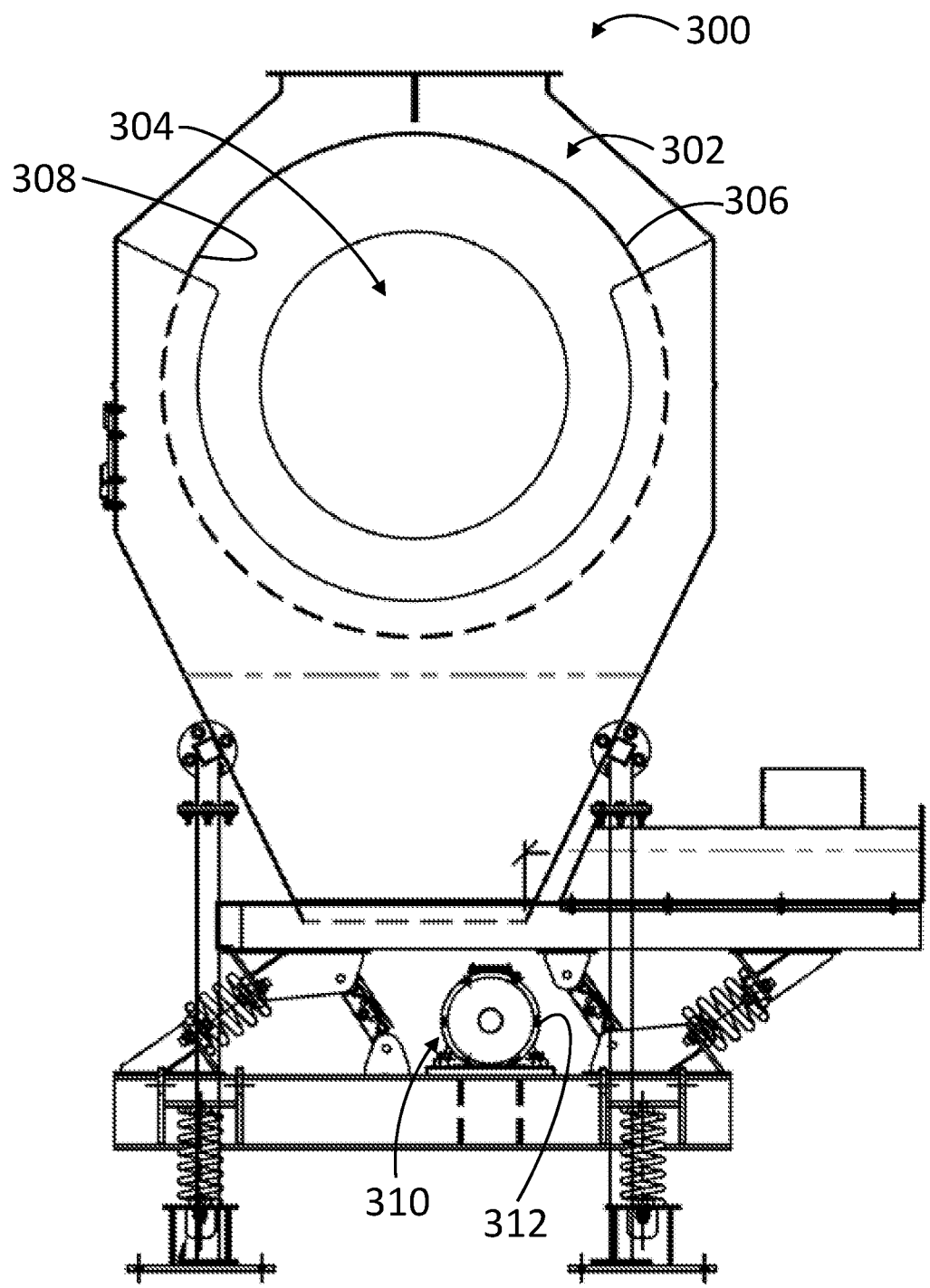
FIG. 3 illustrates an example of a separating unit.

Referring now to FIG. 3, shown therein is an example separator 300. The separator 300 may, for example, be a tumbler. In the example illustrated, the separator 300 includes a container 302. The container 302 includes an interior 304 defined by an exterior wall 306. In the example illustrated, the dividing surface 308 is provided within the interior 304 of the container.

Still referring to FIG. 3, in the example illustrated, the separator 300 includes a drive mechanism 310 to rotate the container 302. As shown, the drive mechanism may be located external to the container 302. The drive mechanism may include a motor 312 and a belt (not shown). In the example illustrated, the drive mechanism is separated from the container such that no shot or fragments that pass through the dividing surface can enter the drive mechanism. This may be desirable, because fragments and/or shot can have sharp edges which could, if allowed to enter the drive mechanism, sever the belt or damage the motor.

Figure 4:
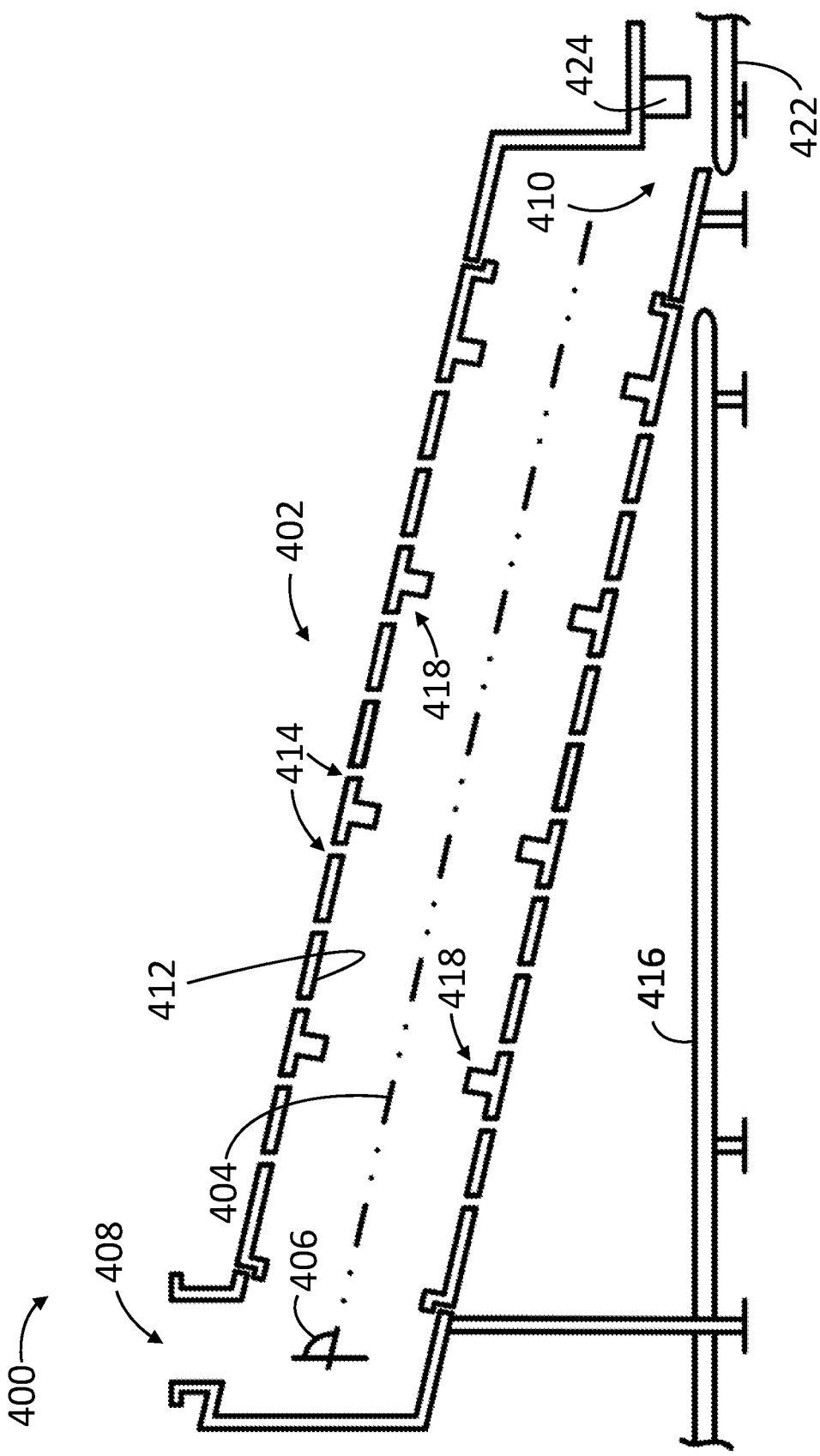
FIG. 4 illustrates a second example of a separating unit.

Referring now to FIG. 4, shown therein is another example of a separator, separator 400. Features discussed below with respect to separator 400 may be applied to separator 300 and examples discussed above in reference to separator 300 can be applied to separator 400.

As shown, the separator 400 includes a container 402 that extends along a rotational axis 404. As shown, the rotational axis 404 may extend at an angle 406 to the vertical. In some examples, the rotational axis may be at an angle between 70 degrees and 90 degrees to the vertical (that is, may be oriented between having a slight slope of 20 degrees and being substantially horizontal).

In example illustrated, the container has an inlet 408 for receiving the shot and fragment mixture and an outlet 410 for discharging the remaining plurality of shot. In the example illustrated, as the container 402 rotates about the rotational axis, the shot and fragment mixture may move adjacent the dividing surface 412 having a plurality of holes 414. Due to the angle of the container, the mixture may be drawn by gravity along the dividing surface 412 towards the outlet 410. In the example illustrated, a conveyor belt 416 may be located proximate the dividing surface 412 to collect the shot and any fragments that may pass through the dividing surface.

Still referring to FIG. 4, in the example illustrated, the container includes a plurality of ribs 418 extending inwardly from the dividing surface 412. The ribs 418 may inhibit the movement of the mixture as is moves adjacent the dividing surface 412. By inhibiting the movement, the ribs may increase the amount of time, i.e. decrease a flow-through rate, a fragment takes on average to move from the inlet 408 to the outlet 410.

The greater the amount of time the average fragment takes to move from the inlet 408 to the outlet 410, i.e. the lower the flow-through rate, the higher the likelihood of shot passing through the dividing surface. The flow-through rate may also be adjusted by (a) increasing or decreasing the angle of the separator; and/or (b) increasing or decreasing the rotational speed of the separator. That is, to reduce the flow-through rate, the downward inclination of the separator may be reduced, the rotational speed of the separator may be reduced, or both. Alternatively, to increase the likelihood of shot passing through the dividing surface 412, the holes 414 in the dividing surface 412 may be enlarged. It can be harder to adjust the size of the holes 414 in the dividing surface 412 than to decrease the angle and rotational speed of the separator, as this may require changes in the equipment itself, and not merely in how this equipment is operated. Therefore, the size of the holes 414 in the dividing surface 412 may be adjusted if and only if, for example, the amount of shot that passes through the dividing surface is consistently too low.

In some examples, the flow-through rate may be periodically adjusted. For example, the flow-through rate can be reduced to improve the removal of shot from the remaining plurality of fragments and to increase the average length of time it takes for a fragment to pass through the container 402 from the inlet 408 to the outlet 410. Accordingly in some examples of the methods 100 and 200, the method may include the steps of, for example, (a) defining a flow-through rate of the mixture of the plurality of fragments and the plurality of shot within the interior of the container; (b) after separating the remaining plurality of fragments from at least the portion of the plurality of shot, checking the remaining plurality of fragments for residual shot; (c) determining a mass proportion of the residual shot relative to the remaining plurality of fragments containing the residual shot; and (d) when the proportion of the residual shot exceeds a first threshold proportion, reducing the flow-through rate of the mixture of the plurality of fragments and the plurality of shot within the interior of the container. If, on the other hand, the proportion, in terms of mass, of the residual shot to the remaining plurality of fragments containing the residual shot remains below a second threshold proportion, which is lower than the first threshold proportion, then the flow rate may possibly be increased (by, e.g., increasing the angle of the separator) to improve speed and efficiency by reducing the average length of time it takes for a fragment to pass through the container 402 from the inlet 408 to the outlet 410. Further, if the proportion of the residual shot to the remaining plurality of fragments containing the residual shot remains between the first threshold proportion and the second threshold proportion, the flow-through rate may be left unchanged.

Accordingly, in some examples of the methods 100 and 200, the method may include the step of moving the mixture of the plurality of fragments and the plurality of shot along an inclined path adjustable to have a downward inclination within an inclination range between a maximum downward inclination and one of a minimum downward inclination and a horizontal inclination. Further the method may include the step of reducing the flow-through rate by reducing the downward inclination within the inclination range. Alternatively, the method may include the step of increasing the flow-through rate of the mixture of the plurality of fragments and the plurality of shot within the interior of the container, when the second threshold proportion exceeds a proportion of the residual shot to the remaining plurality of fragments containing the residual shot. In some examples, the threshold proportions may be based at least partly on an aggregate composition estimate of the remaining plurality of fragments as well as a selected target alloy and the known composition of the shot. As described above, the remaining plurality of fragments has an aggregate or batch composition based on the compositions of the different fragments, as well as the relative masses of those fragments. For example, if all remaining fragments were to be melted down and mixed to provide a homogeneous aggregate or mixture, then this aggregate or batch composition would have the composition of that homogeneous mixture.

This batch composition of the feed of aluminum alloy wheels may be unknown when the wheels are initially provided. Accordingly, to determine the aggregate composition estimate for the remaining plurality of fragments, a plurality of composition measurements of the material of the remaining plurality of fragments may be made. The aggregate composition estimate may include a plurality of element concentration estimates comprising an element concentration estimate for each element in a plurality of elements.

For example, the aggregate composition estimate may be determined as follows. First, a mass of the remaining plurality of fragments may be determined. For example, a bulk batch of remaining fragments may be measured together, to determine a total mass of the remaining plurality of fragments. Any method known in the art to measure the mass of objects may be used, including but not limited to mechanical spring scales, mechanical balance scales, hydraulic scales, strain gauge based electronic scales or load cell based electronic scales.

Next, a plurality of composition measurements of the material of a portion of the remaining plurality of fragments may be taken. These measurements may be used to estimate the aggregate composition of the entirety of the remaining plurality of fragments. Any statistical method known in the art may be used to determine the minimum size of a smaller sample population required to statistically represent the larger population such that attributes of the larger population can be inferred from the attributes measured for the smaller population. Statistical methods may also be used to provide uncertainty values of aggregate composition estimates.

For example, the average composition of elements found in a sample population, that is the above-mentioned portion of the remaining plurality of fragments, can be measured to estimate the average composition of elements found in the entirety of the remaining plurality of fragments. And a mass of the remaining plurality of fragments, may be measured and then multiplied by the mass fractions of each element detected by the composition analyzer. For example, say the total mass of the entirety of the remaining plurality of fragments is 1000 lbs. Now say that the proportion of silicon in the portion of the remaining plurality of fragments measured was 6.3%, from which we infer that the aggregate composition estimate for silicon in the entirety of the remaining plurality of fragments is 6.3%, and that the amount of silicon in the entirety of the remaining plurality of fragments is 63 lbs. Corresponding estimate may be made for multiple elements found within the fragments such as, for example, copper, iron, magnesium, zinc, manganese, nickel, chromium, tin, strontium, titanium, and aluminum.

Any method known in the art to measure the composition of a material sample may be used. In some examples, a laser scanner can be used to measure the composition of the portion of the remaining plurality of fragments. This can involve using a laser to heat the material at a point on the surface of a remaining fragment to a temperature at which that material will emit a characteristic radiation while cooling down. A sensor can then be operated to detect that characteristic radiation to provide a spectrum of signal magnitudes at different frequencies. This spectrum of signal magnitudes at different frequencies can then be analyzed by a computer processor to infer the relative concentrations of different elements within the alloy, as described, for example, in U.S. Pat. No. 10,220,418, incorporated herein by reference.

In one example, a "Laser-Induced Breakdown Spectroscopy" ("LIBS") composition analyzer manufactured by Laser Distance Spectrometry may be adapted as the laser scanner and sensor. The LIBS composition analyzer may include a radiation emitter, such as an Nd:YAG laser. The laser may shine at a frequency ranging from 1 to 20 hertz, thereby raising the temperature of the fragments at the point of contact between the fragment and the laser to above 30,000 degrees Celsius and generating plasma. The plasma may quickly cool down, returning the energized ions to a low energy state. While returning to the low energy state, the ions may emit characteristic radiation. The LIBS composition analyzer may contain one or more sensors that detect the characteristic radiation. A processor may then analyze readings obtained from the sensors and determine from them the concentration of the constituents contained in the material undergoing the temperature change. The processor may be disposed within the composition analyzer. Alternatively, the processor may be a remote processor.

Other suitable composition analyzers may include composition analyzers that use laser spectroscopy or other systems that rely on other methods of inducing characteristic radiation to be emitted by a material of each fragment at a surface of that fragment and detecting and analyzing that characteristic radiation to determine a composition of that material. The composition analyzers may detect the characteristic radiation by using any suitable sensor—for example, suitable sensors may include complementary metal-oxide-semiconductor (CMOS), high density, short channel metal-oxide-semiconductor (HMOS), charge-coupled device (CCD), and other types of sensors.

Suitable composition analyzers may use, for example, radiation emitters such as plasma, electron beam, or any other radiation emitters suitable to heat a material of each fragment in at least one spot on a surface of that fragment to a point where the material will emit a sufficient quantity and quality of characteristic radiation while cooling down so as to permit a sensor to detect that characteristic radiation and to allow for a processor to determine a composition of the material from that characteristic radiation. The composition analyzer can be adapted to withstand continuous use, as well as typical conditions that may be present in a particular aluminum alloy rim recycling operation. Such conditions may include vibrations resulting from the operation of aluminum alloy rim transfer mechanisms, and dust and other particles produced in the recycling process. Alternatively, other means of detecting composition not involving measuring characteristic radiation may be used.

Once the aggregate composition estimate is determined, a selected target alloy may be selected. Specifications for a plurality of prospective target alloys may be considered in making that selection. Each of the prospective target alloys may have a different elemental composition. Small variations in elemental composition may result in large variations of material properties. Certain sets of material properties may be more desirable than others. More desirable properties may translate to a material with a higher economic value. Target alloys may be selected by material properties, economic value, market demand, urgent requests from customers such as foundry operators, or other attributes. In some embodiments, target alloys may be selected at least partially based on the aggregate composition estimate.

Given the aggregate composition estimate and the selected target alloy, the first and second threshold proportions can be determined. For example, using the aggregate composition estimate it can be estimated that the remaining plurality of fragments contains 0.35% by weight of magnesium, while the selected target alloy, say aluminum alloy A356.2, has an upper limit of 0.45% by weight of magnesium. Further, it may be known that the steel shot used to shot blast has a high weight percent of magnesium and that, at the present flow-through rate, there is a 10% chance that the residual shot may make up as much as 1% of the combined mass of the residual shot and the remaining plurality of fragments. Say that if 1% of the batch by mass is steel shot, then this may increase the batch's mass percent of magnesium (or other contaminant such as iron) outside the ranges permitted for A356.2. Thus, the first threshold proportion should be set sufficiently low, say 0.5%, such that the batch's mass percent of magnesium remains inside the ranges permitted for A356.2. Accordingly, the flow-through rate of the mixture may be reduced to increase the likeliness of separating out the steel shot from the remaining plurality of fragments, to thereby reduce the magnesium level in the remaining plurality of fragments (or reduce the probability of the weight percent of magnesium or iron of the batch exceeding the ranges permitted for A356.2.

While it is important to keep the mass proportion of the residual shot relative to the remaining plurality of fragments low, it is also important to avoid slowing down the flow-through rate of the separation step more than necessary. The second threshold proportion can be defined to indicate when the separation step may have been slowed down more than necessary to remove shot. It may, for example, be determined that enough steel shot is separated out during the separating step, such that it is very likely the residual shot will make up less than 0.1% of the combined mass of the residual shot and the remaining plurality of fragments containing the residual shot. Say that the second threshold proportion is 0.2%. In this case, the flow-through rate of the mixture may be increased to increase production of remaining fragments.

It may also be determined that enough steel shot is being separated out during the separating step such that, to use the numbers provided above, it is very likely that the residual shot will make up more than 0.2% but less than 0.5% of the combined mass of the residual shot and the remaining plurality of fragments containing the residual shot. In this case, the flow-through rate of the mixture may not be adjusted.

These examples of 0.5% and 0.2% for the first and second threshold proportions respectively are provided for illustration only. In many cases, depending on factors such as the composition of the shot, the composition of the fragments and the ranges of different elements specified for the target alloy (which may or may not be A356.2), the first and second threshold proportions may be very different.

In some examples, the aggregate composition estimate for the remaining plurality of fragments may be continuously calculated. That is, multiple estimates of the aggregate composition estimate for the remaining plurality of fragments may be made for a single feed of waste metal pieces. Accordingly, the flow-through rate of the mixture may be altered multiple times during the recycling process of one feed of waste metal pieces.

In some examples, to determine the amount of residual shot retained with the remaining plurality of fragments, and to remove some or all of this residual shot, a magnet may be used to magnetically attract residual shot within the remaining plurality of fragments. In this example, each shot of the residual shot must be attractable by a magnet and the magnet must be of sufficient strength and proximity to that shot to exert a magnetic force on that shot sufficient to draw that shot into contact with the at least one magnet (to capture that shot).

In some embodiments in which a magnet is used to magnetically capture residual shot within the remaining plurality of fragments, it may be unreasonable to assume that this magnet will capture all of the residual shot present in the remaining plurality of fragments. For these embodiments, a final residual shot estimate may be determined based on the residual shot captured by the magnet. The final residual shot estimate is an estimate of the proportion of shot that makes it through the separator and past the magnet without being separated from the remaining plurality of fragments, such that this final residual shot remains in the remaining plurality of fragments. As, absent any further separation steps, this final residual shot will partly constitute the batch of recycled materials, and it should be taken into account to determine the aggregate composition estimate. The greater the quantity of residual shot captured by the magnet, the greater the final residual shot estimate (the relation between the quantity of residual shot captured by the magnet and the final residual shot estimate may be empirically determined). Then, if the final residual shot estimate exceeds the first threshold proportion, the flow-through rate can be reduced as described above, while if the final residual shot estimate falls below the second threshold proportion, the flow-through rate can be increased.

For a number of reasons, the level of residual shot should be reduced before the remaining plurality of fragments and the residual shot reach the magnet. If the magnet becomes completely covered with shot, then this may make it more difficult to attract and retain other shot. Also, the more residual shot present in the remaining plurality of fragments, the more likely it is that some of this residual shot will get by the magnet. And it can be difficult to remove the shot stuck to the magnet. If the level or residual shot captured by the magnet is low enough, then the final residual shot estimate may be zero.

In some examples, a magnet, or a plurality of magnets may be placed close enough to the remaining plurality of fragments, after these fragments have passed through the separator, to attract and remove a portion of any residual shot from the remaining plurality of fragments. That is, after moving the mixture of the plurality of fragments and the plurality of shot adjacent the dividing surface such that at least a portion of the plurality of shot passes through the dividing surface via the plurality of holes, the remaining plurality of fragments and any residual shot may be moved within a trapping distance of at least one magnet such that the at least one magnet exerts a magnetic force on the residual shot sufficient to draw that residual shot into contact with the at least one magnet.

For example, referring again to FIG. 4, as shown a conveyor 422 may be placed proximate the outlet 410 of the container 402. Above the conveyor, a magnet 424 may be placed within a trapping distance of the conveyor. In this example, if a piece of shot were to be on the conveyor, it may be attracted to the magnet and therefore removed from the remaining plurality of fragments.

Figure 5:
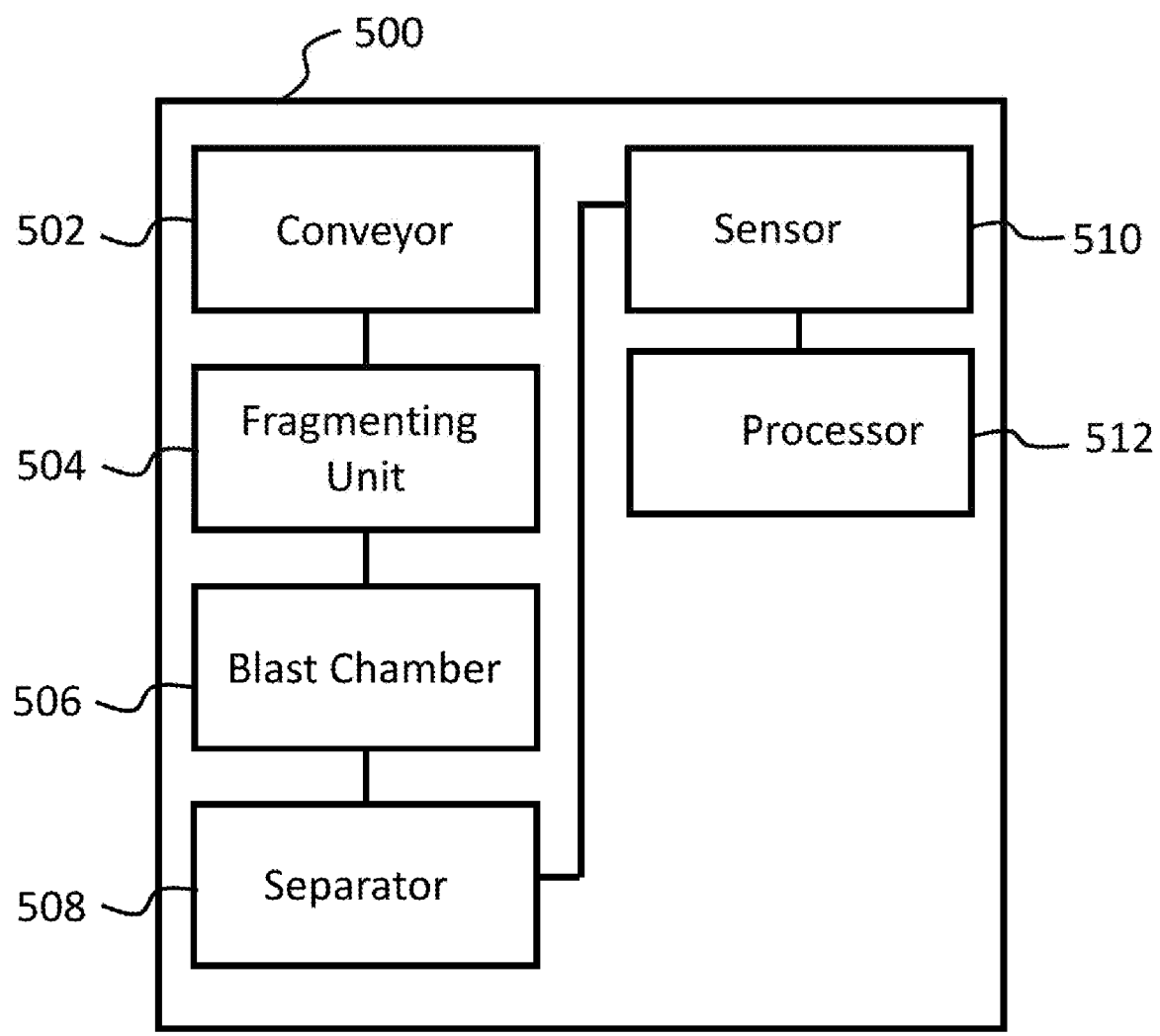
FIG. 5, in a block diagram, illustrates a system for recycling aluminum alloy wheels.

Referring now to FIG. 5, shown therein is a block diagram of a system 500 for recycling aluminum alloy wheels. As shown, the system 500 for recycling aluminum alloy wheels may include a conveyor 502, a fragmenting unit 504, a blast chamber 506, and a separator 508. System 500 is an example of a system for carrying out method 100 or 200, as described above. Accordingly, examples discussed below may be applied to methods 100 and 200, and examples discussed above in reference to methods 100 and 200 can be applied to the system 500. Moreover, the discussion below is not meant to limit the methods described herein to that of recycling aluminum alloy wheels. For example, the systems described herein may be applied to a method for recycling objects made of steel alloys, copper alloys, or any other suitable metal, and these objects need not be wheels.

The conveyor 502 may provide a feed of waste metal pieces, such as, for example without limitation, aluminum alloy wheels, of a particular alloy. The aluminum alloy wheels may be loaded onto the conveyor 502 by any suitable means (for example without limitation, by a truck dumping wheels into a hopper connected to one end of the conveyor 502 or manually by workers placing wheels on the conveyor).

In some examples of the system 500 for recycling aluminum alloy wheels, the fragmenting unit 504 can receive the feed of aluminum alloy wheels from the conveyor 502. As described above, the fragmenting unit 504 can fragment the wheels into a plurality of fragments. As described above, in some examples, the fragmenting unit may fragment the aluminum alloy wheels into a plurality of fragments such that more than 95% of a mass of the quantity of the aluminum alloy wheels is fragmented into fragments having a maximum length of more than ½ L.

In some examples, the fragmenting unit may be a shredder or a cutter and a plurality of blades may be used to cut the waste metal pieces into a plurality of fragments. In other examples, the fragmenting unit may be a waterjet cutter.

In the example illustrated, the system 500 for recycling aluminum alloy wheels includes a blast chamber 506. The blast chamber 506 can receive the feed of fragments from the fragmenting unit 504. Within the blast chamber 506, abrasives such as shot may be projected against the fragments to clean their surfaces (shot blasting). As described above, the impact of the shot with these surfaces can remove coatings, corrosion, environmental contamination and debris from the surfaces. In some examples of the system 500, the blast chamber 506 may be a centrifugal blasting apparatus. In some examples, the blast chamber comprises a plurality of shot to provide the shot blasting, and each shot in the plurality of shot has a maximum length of ⅛ L or less.

The centrifugal blasting apparatus may include a housing that completely encloses a conveying means formed of a plurality of flights extending crosswise between endless chains for travel along a predetermined path. This housing can be sectioned into four compartments including one entrance chamber, two blast chambers, and one shakeout chamber. The flights in the blast chambers can be made of blast-resistant manganese rods, while the flights in the shakeout and entrance chambers can be made of less expensive lighter duty material. The debris removed from the waste metal pieces can be removed from the system in the shakeout chamber, and the spent abrasive can be re-circled back to the blast wheel.

A feed of shot blasted pieces produced in the blast chamber 506 can be directed towards the separator 508. Separator 508 may be similar to separators 300 and 400 described above. That is, the separator 508 may include a dividing surface for separating the plurality of fragments from the plurality of shot. In some examples, the dividing surface includes a plurality of holes wherein each hole in the plurality of holes is large enough for objects having a maximum length of ⅜ L or less to pass through and small enough to block objects having a maximum length of ⅝ L or more from passing through.

In some examples, the system 500 may include a passageway for the remaining plurality of fragments. The passageway may be located following the separator 508. In some examples, at least one magnet may be positioned within the passageway to magnetically attract residual shot within the remaining plurality of fragments. To attract any residual shot, the shot must be attractable by the at least one magnet. Further, to attract the shot, the at least one magnet must be of sufficient strength. That is, a cross-sectional area of the passageway intersecting with the at least one magnet can be small enough, such that, in operation, any shot in the residual shot passing through the cross-sectional area is close enough to the at least one magnet for the at least one magnet to exert a magnetic force on that shot sufficient to draw that shot into contact with the at least one magnet. In some examples, the passageway may be movable to move the remaining plurality of fragments through the passageway, including through the cross-sectional area of the passageway intersecting with the at least one magnet. In some examples, the passageway may include a conveyor belt.

In some examples, the system 500 may include at least one sensor 510, which may be used to sense the remaining plurality of fragments to determine a plurality of composition measurements of the material of different fragments in the remaining plurality of fragments. In some examples of the system 500, the at least one sensor 510 may include a laser spectroscopy device.

In some examples, the system 500 may include at least one processor 512 which may be used to determine an aggregate composition measurement by measuring the composition of the material of at least a portion of the remaining plurality of fragments. The at least one processor 512 may be linked for communication with the at least one sensor 510. The at least one processor 512 may be used to compute an estimate of the composition of the aggregate composition of the remaining plurality of fragments.

The present invention has been described here by way of example only. Various modification and variations may be made to these exemplary embodiments without departing from the spirit and scope of the invention, which is limited only by the appended claims.

I claim:

1. A method of recycling aluminum alloy wheels, the method comprising:
   providing a feed of aluminum alloy wheels of a particular alloy;
   fragmenting the aluminum alloy wheels into a plurality of fragments such that more than 95% of a mass of the quantity of the aluminum alloy wheels is fragmented such that each fragment in the 95% of the mass of the quantity of the aluminum alloy wheels has a maximum length of more than ½ L, where the maximum length is a greatest distance between any two points on a fragment and L is a distance of at least 1 inch;
   providing a plurality of shot wherein each shot in the plurality of shot has a maximum length of ⅛ L or less;
   shot blasting the plurality of fragments with the plurality of shot to clean non-aluminum contaminants off the plurality of fragments;
   providing a dividing surface for separating the plurality of fragments from the plurality of shot, the dividing surface having a plurality of holes wherein each hole in the plurality of holes is large enough for objects having a maximum length of ⅜ L or less to pass through and small enough to block objects having a maximum length of ⅝ L or more from passing through;
   after shot blasting the plurality of fragments with the plurality of shot, separating the plurality of fragments from the plurality of shot by moving a mixture of the plurality of fragments and the plurality of shot adjacent the dividing surface such that at least a portion of the plurality of shot passes through the dividing surface via the plurality of holes, separating at least the portion of the plurality of shot from a remaining plurality of fragments not passing through the dividing surface via the plurality of holes; and
   providing the remaining plurality of fragments for use in manufacturing at least one component made from aluminum alloy.

2. The method as defined in claim 1 wherein
   the maximum length of each shot in the plurality of shot is 1/16 L or less; and,
   the maximum length of each fragment in the plurality of fragments is at least L.

3. The method as defined in claim 1 or 2 wherein providing the dividing surface for separating the plurality of fragments from at least the portion of the plurality of shot comprises providing a container having an interior defined by an exterior wall, the dividing surface being provided within the interior of the container.

4. The method as defined in claim 3 wherein moving the mixture of the plurality of fragments and the plurality of shot adjacent the dividing surface comprises moving the container and the dividing surface.

5. The method as defined in claim 4 wherein
   moving the container and the dividing surface comprises operating a drive mechanism to rotate the container; and,
   the drive mechanism is separated from the plurality of fragments and the plurality of shot by the exterior wall of the container to isolate the drive mechanism from the plurality of fragments and the plurality of shot within the interior of the container.

6. The method as defined in claim 5 further comprising:
   defining a flow-through rate of the mixture of the plurality of fragments and the plurality of shot within the interior of the container;
   after separating the remaining plurality of fragments from at least the portion of the plurality of shot, checking the remaining plurality of fragments for residual shot;
   determining a mass proportion of the residual shot relative to the remaining plurality of fragments containing the residual shot; and
   when the proportion of the residual shot exceeds a first threshold proportion, reducing the flow-through rate of the mixture of the plurality of fragments and the plurality of shot within the interior of the container; otherwise not reducing the flow-through rate.

7. The method as defined in claim 6 further comprising
   determining an aggregate composition estimate for the remaining plurality of fragments by determining a plurality of composition measurements of the material of the remaining plurality of fragments, the aggregate composition estimate comprising a plurality of element concentration estimates comprising an element concentration estimate for each element in a plurality of elements;
   selecting a selected target alloy, the selected target alloy having a plurality of element ranges comprising an element range for each element in the plurality of elements; and determining the first threshold proportion based on the aggregate composition estimate and the selected target alloy.

8. The method as defined in claim 1, wherein more than 99% of the mass of the quantity of the aluminum alloy wheels is fragmented into fragments having the maximum length of L or more.

9. The method as defined in claim 6 wherein
checking the remaining plurality of fragments for residual shot comprises operating at least one magnet to magnetically attract the residual shot within the remaining plurality of fragments, each shot of the residual shot being attractable by the at least one magnet, and
the at least one magnet is of sufficient strength and proximity to that shot to exert a magnetic force on that shot sufficient to draw that shot into contact with the at least one magnet.

10. The method as defined in claim 1 further comprising, after moving the mixture of the plurality of fragments and the plurality of shot adjacent the dividing surface such that at least a portion of the plurality of shot passes through the dividing surface via the plurality of holes, moving the remaining plurality of fragments and any residual shot within a trapping distance of at least one magnet such that the at least one magnet exerts a magnetic force on the residual shot sufficient to draw that residual shot into contact with the at least one magnet.

11. The method as defined in claim 6 wherein moving the mixture of the plurality of fragments and the plurality of shot adjacent the dividing surface comprises moving the mixture of the plurality of fragments and the plurality of shot along an inclined path adjustable to have a downward inclination within an inclination range between a maximum downward inclination and one of a minimum downward inclination and a horizontal inclination.

12. The method as defined in claim 11 wherein reducing the flow-through rate comprises reducing the downward inclination within the inclination range.

13. The method as defined in claim 6 wherein when a second threshold proportion exceeds a mass proportion of the residual shot relative to the remaining plurality of fragments containing the residual shot, the method further comprises increasing the flow-through rate of the mixture of the plurality of fragments and the plurality of shot within the interior of the container; otherwise not increasing the flow-through rate.

14. A system for recycling aluminum alloy wheels, the system comprising:
a conveyor for providing a feed of aluminum alloy wheels of a particular alloy;
a fragmenting unit for receiving the feed of aluminum alloy wheels from the conveyor and for fragmenting the aluminum alloy wheels into a plurality of fragments such that more than 95% of a mass of the quantity of the aluminum alloy wheels is fragmented into fragments having a maximum length of more than ½ L, where the maximum length is a greatest distance between any two points on a fragment and L is a distance of at least 1 inch;
a blast chamber for receiving the plurality of fragments from the fragmenting apparatus and for subjecting the plurality of fragments to shot blasting to provide a plurality of shot blasted pieces, wherein the blast chamber comprises a plurality of shot to provide the shot blasting, and each shot in the plurality of shot has a maximum length of ⅛ L or less; and,
a separator for receiving the plurality of fragments and the plurality of shot blasted pieces, the separator comprising a dividing surface for separating the plurality of fragments from the plurality of shot, the dividing surface having a plurality of holes wherein each hole in the plurality of holes is large enough for objects having a maximum length of ⅜ L or less to pass through and small enough to block objects having a maximum length of ⅝ L or more from passing through;
wherein, in operation, a mixture of the plurality of fragments and the plurality of shot is moved adjacent the dividing surface such that at least a portion of the plurality of shot passes through the dividing surface via the plurality of holes, separating at least the portion of the plurality of shot from a remaining plurality of fragments not passing through the dividing surface via the plurality of holes; the remaining plurality of fragments being usable to manufacture at least one component made from aluminum alloy.

15. The system as defined in claim 14 wherein
the maximum length of each shot in the plurality of shot is 1/16 L or less; and,
the maximum length of each fragment in the plurality of fragments is at least L.

16. The system as defined in claim 14 or 15 wherein the separator further comprises a container having an interior defined by an exterior wall, the dividing surface being provided within the interior of the container.

17. The system as defined in claim 16 wherein the container and the dividing surface are moveable to move the mixture of the plurality of fragments and the plurality of shot adjacent the dividing surface.

18. The system as defined in claim 17 wherein
the separator further comprises a drive mechanism for rotating the container to move the container and the dividing surface, and to move the mixture of the plurality of fragments and the plurality of shot adjacent the dividing surface; and,
the drive mechanism is separated from the plurality of fragments and the plurality of shot by the exterior wall of the container to isolate the drive mechanism from the plurality of fragments and the plurality of shot within the interior of the container.

19. The system as defined in claim 18 wherein the separator further comprises
a passageway for the remaining plurality of fragments; and
at least one magnet positioned within the passageway to magnetically attract residual shot within the remaining plurality of fragments within the passageway, each shot of the residual shot being attractable by the at least one magnet;
wherein the at least one magnet is of sufficient strength, and a cross-sectional area of the passageway intersecting with the at least one magnet is small enough, such that, in operation, any shot in the residual shot passing through the cross-sectional area is close enough to the at least one magnet for the at least one magnet to exert a magnetic force on that shot sufficient to draw that shot into contact with the at least one magnet.

* * * * *